United States Patent
Lee et al.

(10) Patent No.: US 11,181,452 B2
(45) Date of Patent: Nov. 23, 2021

(54) FOLDING TEST DEVICE

(71) Applicants: SAMSUNG DISPLAY CO., LTD., Yongin-si (KR); COVOTECH Co., Ltd., Hwaseong-si (KR)

(72) Inventors: Sang Wol Lee, Yongin-si (KR); Jin Su Song, Seongnam-si (KR); Jae Bong Lee, Yongin-si (KR); Chang Min Park, Yongin-si (KR); Kyung Min Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 431 days.

(21) Appl. No.: 16/362,108

(22) Filed: Mar. 22, 2019

(65) Prior Publication Data

US 2019/0293535 A1    Sep. 26, 2019

(30) Foreign Application Priority Data

Mar. 23, 2018  (KR) .................. 10-2018-0033881

(51) Int. Cl.
*G01N 3/20*    (2006.01)
*G01N 3/02*    (2006.01)

(52) U.S. Cl.
CPC ............... *G01N 3/20* (2013.01); *G01N 3/02* (2013.01)

(58) Field of Classification Search
CPC ............ G01N 3/20; G01N 3/02; G01M 11/00

USPC ........................................................... 73/854
See application file for complete search history.

(56) References Cited

U.S. PATENT DOCUMENTS

| | | | | |
|---|---|---|---|---|
| 4,848,717 A * | 7/1989 | Bevill | .................. | B25H 1/0007 248/670 |
| 8,302,488 B2 * | 11/2012 | Hsu et al. | ........... | G01M 99/005 73/856 |
| 8,905,362 B2 * | 12/2014 | Hu et al. | ............ | G01R 31/2808 248/185.1 |
| 2021/0016337 A1 * | 1/2021 | Daugherty | ............... | B21D 7/12 |

FOREIGN PATENT DOCUMENTS

| | | | |
|---|---|---|---|
| KR | 101527815 B1 | | 6/2015 |
| KR | 20160000925 A | * | 1/2016 |
| KR | 20170048642 A | * | 5/2017 |

* cited by examiner

*Primary Examiner* — Marrit Eyassu
(74) *Attorney, Agent, or Firm* — Cantor Colburn LLP

(57) ABSTRACT

A folding test device includes a jig including a first support plate and a second support plate rotatably connected to the first support plate, a first rotary plate supporting the first support plate, a second rotary plate supporting the second support plate and separated from the first rotary plate, a first frame separated from the second rotary plate and rotatably connected to the first rotary plate, and a second frame separated from the first rotary plate and rotatably connected to the second rotary plate, wherein the first frame and the second frame are rotatably connected to each other at an intersection point.

14 Claims, 15 Drawing Sheets

FOLDING TEST DEVICE

The application claims priority to Korean patent application 10-2018-0033881, filed on Mar. 23, 2018, and all the benefits accruing therefrom under 35 U.S.C. § 119, the content of which in its entirety is herein incorporated by reference.

BACKGROUND

1. Field

Exemplary embodiments of the invention relate to a folding test device.

2. Description of the Related Art

With a development of information technologies, an importance of a display device which is a connection medium between a user and information increases. Accordingly, display devices such as a liquid crystal display device, an organic light emitting display device, and a plasma display device are increasingly used.

In recent years, unlike conventional flat panel display devices using a glass substrate or the like, display devices that can be folded or bent by a flexible plastic substrate are receiving attention.

A state in which a foldable display device is folded in a manner that display surface faces itself is typically referred to as an in-folding state while a state in which the foldable display device is folded in a manner that non-display surface faces itself is typically referred to as an out-folding state.

SUMMARY

Both an in-folding test and an out-folding test are desired for the foldable display device before shipment. However, an in-folding test device and an out-folding test device that exist separately may be disadvantageous in terms of test cost and time.

Exemplary embodiments provide a folding test device capable of performing both an in-folding test and an out-folding test.

According to an exemplary embodiment of the invention, there is provided a folding test device including a jig comprising a first support plate and a second support plate rotatably connected to the first support plate, a first rotary plate supporting the first support plate, a second rotary plate supporting the second support plate and separated from the first rotary plate, a first frame separated from the second rotary plate and rotatably connected to the first rotary plate, and a second frame separated from the first rotary plate and rotatably connected to the second rotary plate, wherein the first frame and the second frame are rotatably connected to each other at an intersection point.

In an exemplary embodiment, when a test object is in an un-folding state, a first end of the first frame and a first end of the second frame may be adjacent to each other, and a second end of the first frame and a second end of the second frame may be adjacent to each other.

In an exemplary embodiment, a first end of the first frame may gradually move farther from the first of the second frame and closer to the second end of the second frame, and a first of the second frame may be gradually closer to the second end of the first frame the test object is folded.

In an exemplary embodiment, when an in-folding test of the test object is performed, the first rotary plate may be rotatably connected to the first end of the first frame, and the second rotary plate may be rotatably connected to the second end of the second frame.

In an exemplary embodiment, when an out-folding test of the test object is performed, the first rotary plate may be rotatably connected to the second end of the first frame, and the second rotary plate may be rotatably connected to the first end of the second frame.

In an exemplary embodiment, when the test object is in a folding state, a first angle between the first rotary plate and the second rotary plate may be smaller than a second angle between the first frame and the second frame, and the first angle and the second angle may gradually decrease as the test object is further folded.

In an exemplary embodiment, when the test object is in an in-folding state, a distance between the first rotary plate and the second rotary plate may be greater than a distance between the first support plate and the second support plate.

In an exemplary embodiment, when the test object is in an out-folding state, a distance between the first rotary plate and the second rotary plate may be smaller than a distance between the first support plate and the second support plate.

In an exemplary embodiment, the folding test device may further include a rotary driver comprising a rotary shaft, a linear motion member connected to the rotary shaft so as to be linearly movable in an extending direction of the rotary shaft, and a crank connecting the linear motion member and the second end of the first frame.

In an exemplary embodiment, the folding test device may further include a first support member rotatably connected to the first frame and fixed in a position in the folding test device, a second support member rotatably connected to the second frame, and a guide rail allowing the second support member to linearly move in the extending direction of the rotary shaft.

In an exemplary embodiment, the rotary driver may rotate the rotary shaft in a first rotation direction so as to fold the test object.

In an exemplary embodiment, the rotary driver may rotate the rotary shaft in a second rotation direction so as to un-fold the test object, and the second rotation direction may be opposite to the first rotation direction.

In an exemplary embodiment, the folding test device may further include a rotary driver comprising a rotary shaft and an extension member extending in a radial direction from the rotary shaft. The second frame may be coupled to the extension member. The first frame may be gear-engaged to rotate in a direction opposite to a rotation direction of the rotary shaft.

In an exemplary embodiment, the first support plate and the second support plate may be rotatably connected to each other through a gear, and a size of the gear may be determined depending on a radius of curvature of the test object.

BRIEF DESCRIPTION OF THE DRAWINGS

Exemplary embodiments, advantages and features will now be described more fully hereinafter with reference to the accompanying drawings, in which.

DETAILED DESCRIPTION

Figure 1:
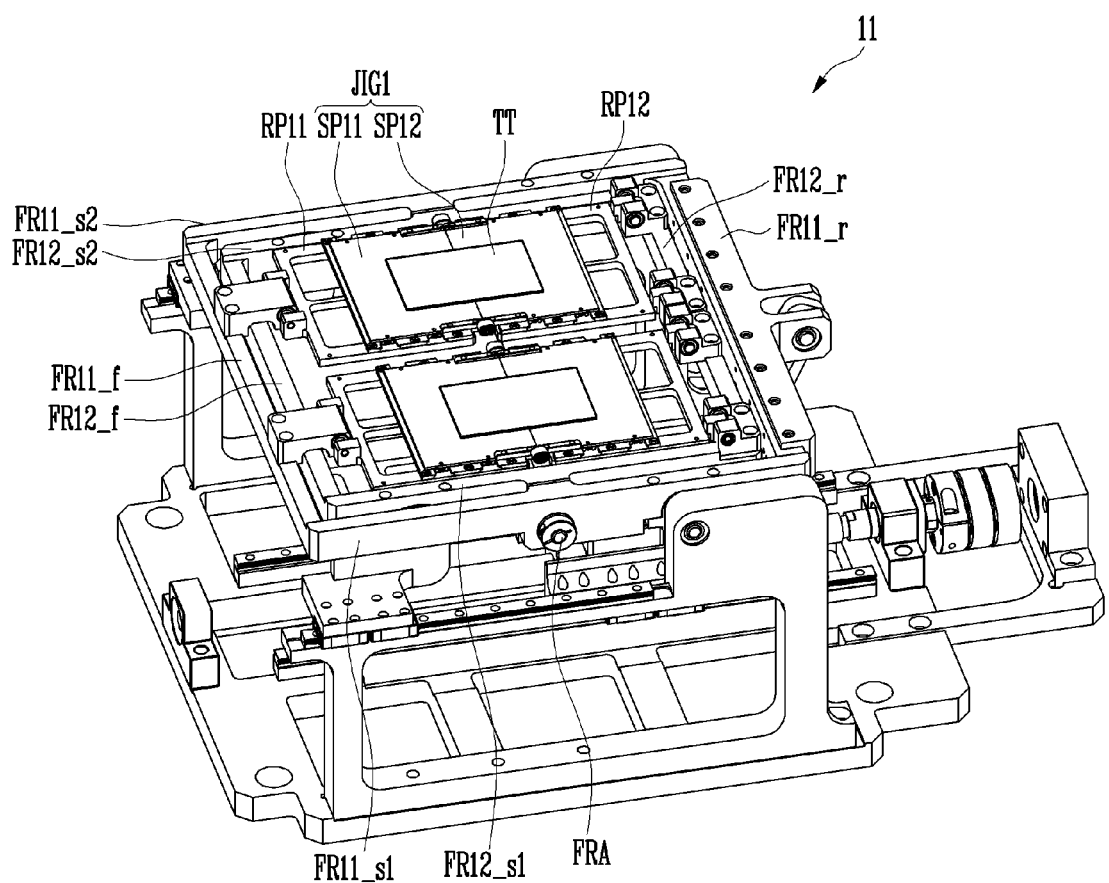
FIG. 1 is a view illustrating an exemplary embodiment of a folding test device according to the invention.

Hereinafter, exemplary embodiments are described in detail with reference to the accompanying drawings so that those skilled in the art may easily practice the invention. The invention may be implemented in various different forms and is not limited to the exemplary embodiments described in the specification.

A part irrelevant to the description will be omitted to clearly describe the invention, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the invention is not limited thereto. Thicknesses of several portions and areas are exaggerated for clear expressions.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a view illustrating a folding test device according to an exemplary embodiment of the invention.

Referring to FIG. 1, a folding test device 11 according to the exemplary embodiment of the invention includes a jig JIG1, a first rotary plate RP11, a second rotary plate RP12, a first frame FR11, and a second frame FR12.

The jig JIG1 includes a first support plate SP11 and a second support plate SP12. The second support plate SP12 is rotatably connected to the first support plate SP11. A test object TT may be disposed on the jig JIG1. An exemplary configuration of the jig JIG1 will be further described with reference to FIG. 2.

The jig JIG1 may be supported by the first rotary plate RP11 and the second rotary plate RP12. Specifically, the first rotary plate RP11 supports the first support plate SP11 of the jig JIG1, and the second rotary plate RP12 supports the second support plate SP12 of the jig JIG1. The second rotary plate RP12 according to the exemplary embodiment is separated from the first rotary plate RP11.

In a conventional folding test device, rotary plates were connected to each other. In order to test test objects having different radii of curvature, the rotary plates and a jig had to be replaced depending on the radius of curvature of each test object. However, according to the embodiment, the first rotary plate RP11 and the second rotary plate RP12 are separated from each other so that the first rotary plate RP11 and the second rotary plate RP12 may independently rotate regardless of the radius of curvature of the test object TT. According to the embodiment, the folding test may be performed by only replacing the jig JIG1 depending on the radius of curvature of the test object, thereby improving time and cost effectiveness of the folding test.

The first frame FR11 may include a front frame FR11_f, a side frame FR11_s1 substantially perpendicularly connected to the front frame FR11_f, a rear frame FR11_r substantially perpendicularly connected to the side frame FR11_s1, and a side frame FR11_s2 connecting the front frame FR11_f and the rear frame FR11_r. In an exemplary embodiment, the first frame FR11 may have a rectangular ring form, for example.

The first frame FR11 is separated from the second rotary plate RP12 and rotatably connected to the first rotary plate RP11. In FIG. 1, the front frame FR11_f of the first frame FR11 and the first rotary plate RP11 are rotatably connected to each other for the in-folding test.

The second frame FR12 may include a front frame FR12_f, a side frame FR12_s1 substantially perpendicularly connected to the front frame FR12_f, a rear frame FR12_r substantially perpendicularly connected to the side frame FR12_s1, and a side frame FR12_s2 connecting the front frame FR12_f and the rear frame FR12_r. In an exemplary embodiment, the second frame FR12 may have a rectangular ring form, for example. The size of the second frame FR12 may be smaller than the size of the first frame FR11 and an outer circumferential surface of the second frame FR12 may face an inner circumferential surface of the first frame FR11.

The second frame FR12 is separated from the first rotary plate RP11 and rotatably connected to the second rotary plate RP12. In FIG. 1, the rear frame FR12_r of the second frame FR12 and the second rotary plate RP12 are rotatably connected to each other for the in-folding test.

The first frame FR11 and the second frame FR12 are rotatably connected to each other at an intersection point. The intersection point may refer to a point at which the first frame FR11 and the second frame FR12 always intersect with each other regardless of relative rotational positions of the first frame FR11 and the second frame FR12. In an exemplary embodiment, a rotary shaft FRA may be positioned at the intersection point, for example. The rotary shaft FRA may penetrate the side frame FR11_s1 of the first frame FR11 and the side frame FR12_s1 of the second frame FR12. Therefore, the first frame FR11 and the second frame FR12 may be rotatably connected at the intersection point.

Referring to FIG. 1, the plurality of test objects TT may be simultaneously tested according to the sizes of the first frame FR11 and the second frame FR12. In the following description, however, one test object TT will be tested for convenience of explanation.

Figure 2:
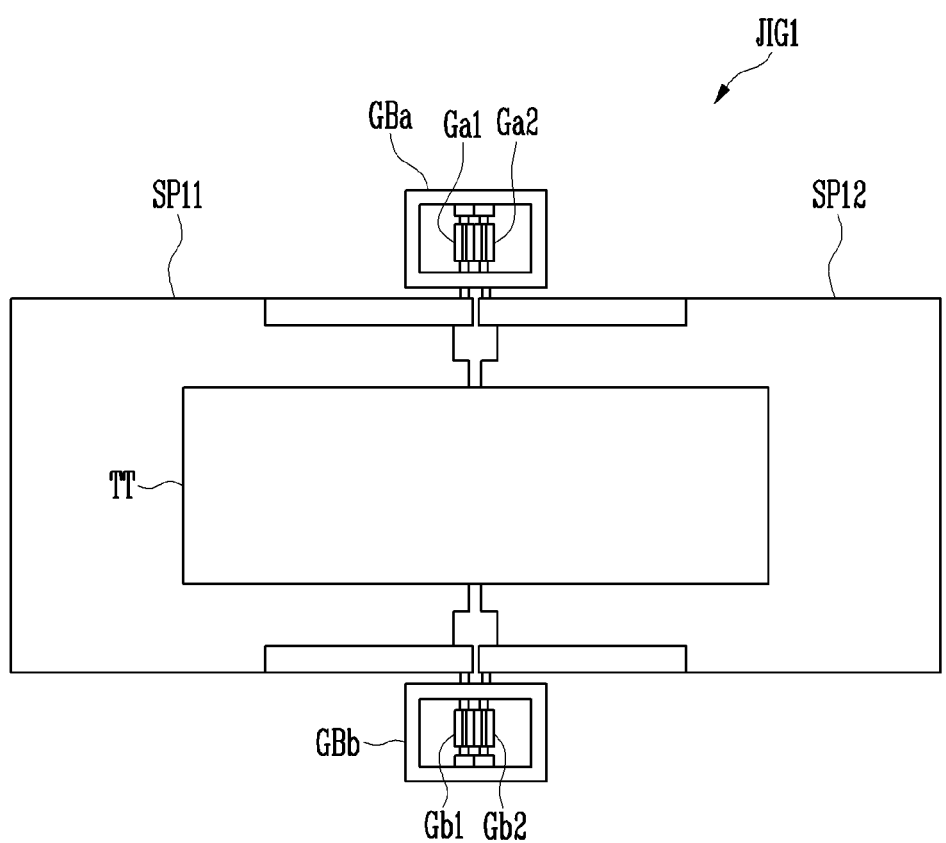
FIG. 2 is a view illustrating a jig according to an exemplary embodiment of the invention.

FIG. 2 is a view illustrating a jig according to an exemplary embodiment of the invention.

Referring to FIG. 2, the jig JIG1 according to an exemplary embodiment of the invention may include the first support plate SP11, the second support plate SP12, and gear boxes GBa and GBb.

The gear box GBa may include gears Ga1 and Ga2 therein. The gear Ga1 and the gear Ga2 may be engaged and connected so as to rotate in opposite directions to each other. A rotary shaft of the gear Ga1 may be connected to the first support plate SP11 and a rotary shaft of the gear Ga2 may be connected to the second support plate SP12.

Similarly, the gear box GBb may include gears Gb1 and Gb2 therein. The gear Gb1 and the gear Gb2 may be engaged and connected so as to rotate in opposite directions to each other. A rotary shaft of the gear Gb1 may be connected to the first support plate SP11 and a rotary shaft of the gear Gb2 may be connected to the second support plate SP12.

Therefore, the first support plate SP11 and the second support plate SP12 may rotate in opposite directions to each other.

According to an exemplary embodiment, a size of at least one of the gears Ga1 and Ga2 and a size of at least one of the gears Gb1 and Gb2 may be determined depending on the radius of curvature of the test object TT. In an exemplary embodiment, at least one of the gears Ga1 and Ga2 and at least one of the gears Gb1 and Gb2 may each have a relatively large size in order to fold the test object TT having a relatively large radius of curvature, for example. On the contrary, at least one of the gears Ga1 and Ga2 and at least one of the gears Gb1 and Gb2 may each have a relatively small size in order to fold the test object TT having a relatively small radius of curvature. The jig JIG1 (refer to FIG. 1) may be replaced according to a design of the test object TT and the radius of curvature when the test object TT is folded.

Figure 3:
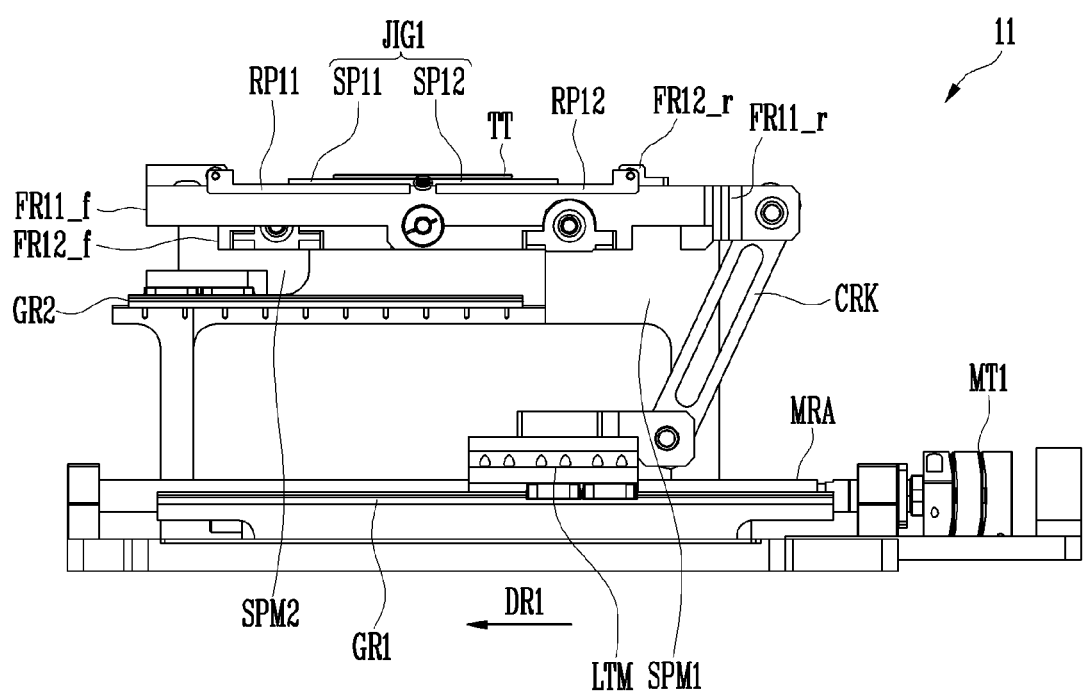
FIGS. 3 to 5 are views illustrating an exemplary embodiment of a process of performing an in-folding test using the folding test device.
Figure 4:
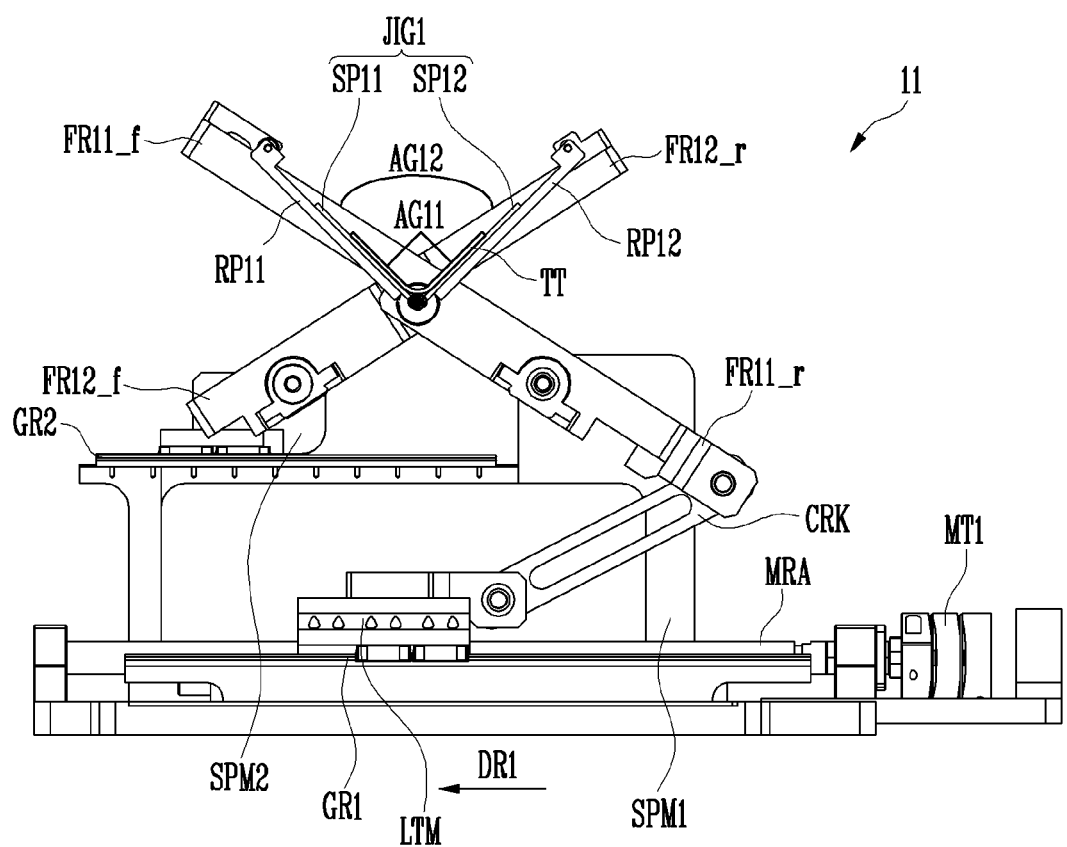
Figure 5:
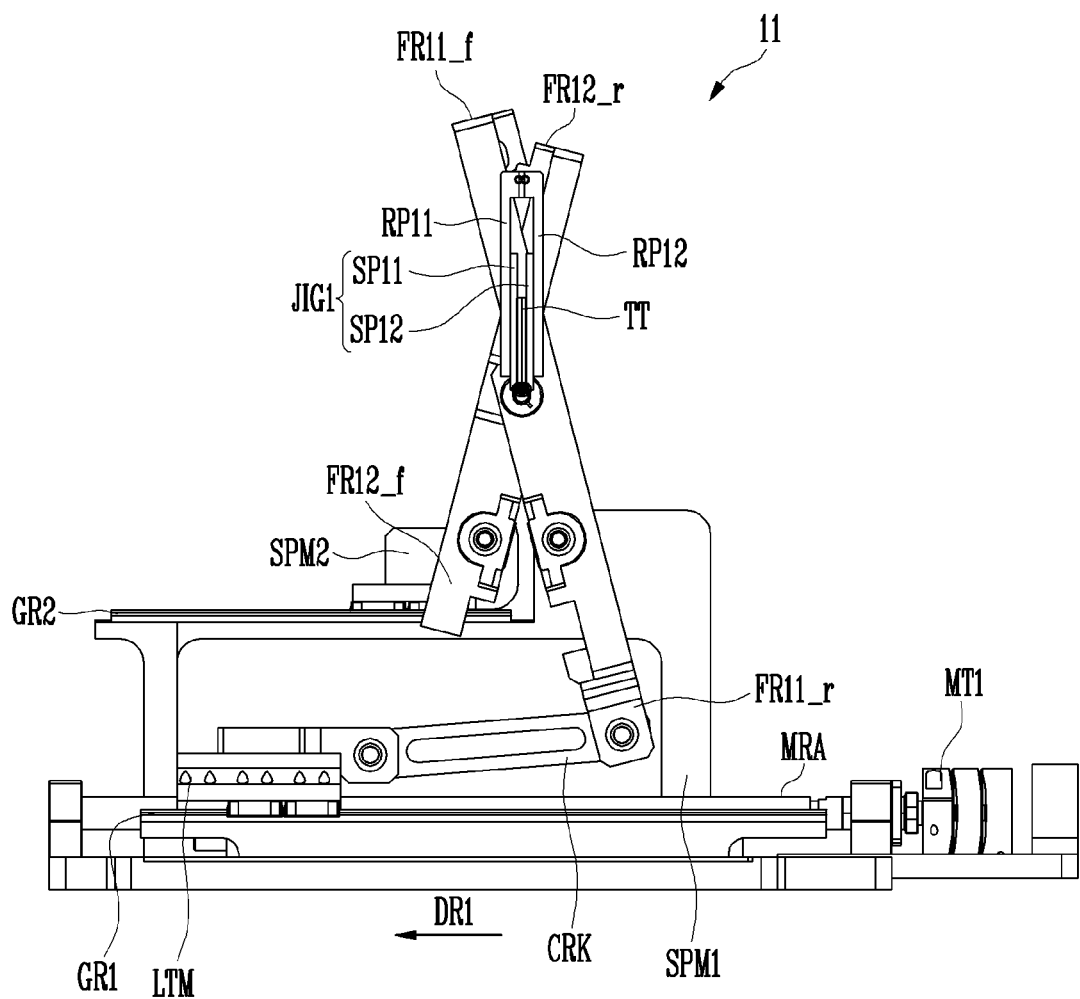

FIGS. 3 to 5 are views illustrating a process of performing an in-folding test using the folding test device according to the exemplary embodiment.

FIG. 3 shows a case where the test object TT is in the un-folding state (substantially 180 degrees). FIG. 4 shows a case where the test object TT is in the in-folding state (substantially 90 degrees). FIG. 5 shows a case where the test object TT is in the completely in-folding state. When the test object TT is a display device, the upper surface may be a display surface and the lower surface may be a non-display surface. Therefore, when a camera is positioned on the upper side of the folding test device 11, a display defect of the test object TT may be checked in the in-folding test procedure.

Referring to FIG. 3, when the test object TT is in the un-folding state, one end of the first frame FR11 and one end of the second frame FR12 may be adjacent to each other, and the other end of the first frame FR11 and the other end of the second frame FR12 may be adjacent to each other.

One end and the other end may be differently determined according to the shapes of the first frame FR11 and the second frame FR12. Referring back to FIG. 1, one end of the first frame FR11 in the exemplary embodiment may refer to the front frame FR11_f, and the other end of the first frame FR11 may refer to the rear frame FR11_r. In another exemplary embodiment, when the first frame FR11 is designed without the front frame FR11_f and the rear frame FR11_r, one end of the first frame FR11 may refer to one end of the side frame FR11_s1, and the other end of the first frame FR11 may refer to the other end of the side frame FR11_s2.

Similarly, one end of the second frame FR12 in the exemplary embodiment may refer to the front frame FR12_f, and the other end of the second frame FR12 may refer to the rear frame FR12_r. In another exemplary embodiment, when the second frame FR12 is designed without the front frame FR12_f and the rear frame FR12_r, one end of the second frame FR12 may refer to one end of the side frame FR12_s1, and the other end of the second frame FR12 may refer to the other end of the side frame FR12_s2.

When the in-folding test of the test object TT is performed, the first rotary plate RP11 may be rotatably connected to one end FR11_f of the first frame FR11, and the second rotary plate RP12 may be rotatably connected to the other end FR12_r of the second frame FR12.

The folding test device 11 of the exemplary embodiment may further include a rotary driver MT1, a linear motion member LTM, a crank CRK, a first support member SPM1, a second support member SPM2, and guide rails GR1 and GR2.

The rotary driver MT1 may include a rotary shaft MRA extending in a first direction DR1. In an exemplary embodiment, the rotary driver MT1 may be a motor, for example.

The linear motion member LTM may be connected to the rotary shaft MRA so as to be linearly movable in the extending direction DR1 (e.g., leftward direction in FIG. 3) of the rotary shaft MRA. In an exemplary embodiment, the rotary shaft MRA and the linear motion member LTM may be connected or engaged by a ball screw method, a bolt-nut method, or any method for transforming a rotary motion into a linear motion, for example. Therefore, a linear motion direction of the linear motion member LTM may be determined in accordance with a rotation direction of the rotary shaft MRA. The linear motion member LTM of which the linear motion direction is determined may linearly move along the guide rail GR1 extending in the first direction DR1.

The crank CRK may connect the linear motion member LTM and the other end FR11_r of the first frame FR11.

The first support member SPM1 may be rotatably connected to the first frame FR11 and may be fixed in position in the folding test device 11.

The second support member SPM2 may be rotatably connected to the second frame FR12. The guide rail GR2 may allow the second support member SPM2 to linearly move in the extending direction DR1 of the rotary shaft MRA.

Referring to FIG. 4, when the test object TT is in-folded, the rotary driver MT1 may rotate the rotary shaft MRA in a first rotation direction. Accordingly, the linear motion member LTM may move in the first direction DR1 as compared with FIG. 3. As the linear motion member LTM moves, the first frame FR11 is drawn by the crank CRK. Therefore, the first frame FR11 may pivot on a point connected with the first support member SPM1. Accordingly, the rotary shaft FRA positioned at the intersection point of the first frame FR11 and the second frame FR12 moves (refer to FIG. 1), and the second frame FR12 moves along the guide rail GR2. Therefore, the second frame FR12 rotates in a direction opposite to that of the first frame FR11.

Referring to FIG. 4, in the case of in-folding the test object TT at substantially 90 degrees, in comparison with FIG. 3, one end FR11_f of the first frame FR11 may gradually move farther from one end FR12_f of the second frame FR12 and closer to the other end FR12_r of the second frame FR12. Also, one end FR12_f of the second frame FR12 may gradually move closer to the other end FR11_r of the first frame FR11.

When the test object TT is in the in-folding state, a first angle AG11 between the first rotary plate RP11 and the second rotary plate RP12 may be smaller than a second angle AG12 between the first frame FR11 and the second frame FR12. The first angle AG11 and the second angle AG12 may gradually decrease as the test object TT is further folded.

Referring to FIG. 5, as the rotary driver MT1 continuously rotates the rotary shaft MRA in the first rotation direction, the test object TT may be completely in-folded. The term "completely in-folded" may refer to a case when the first angle AG11 (refer to FIG. 4) is substantially zero degree.

When the test object TT is completely in-folded, a distance between the first rotary plate RP11 and the second rotary plate RP12 may be greater than a distance between the first support plate SP11 and the second support plate SP12.

In order to un-fold the test object TT again, the rotary driver MT1 may rotate the rotary shaft MRA in a second rotation direction. The second rotation direction may be opposite to the first rotation direction. Accordingly, the linear motion member LTM linearly moves in a direction (e.g., rightward direction in FIG. 5) opposite to the first direction DR1, and the test object TT is un-folded.

Figure 6:
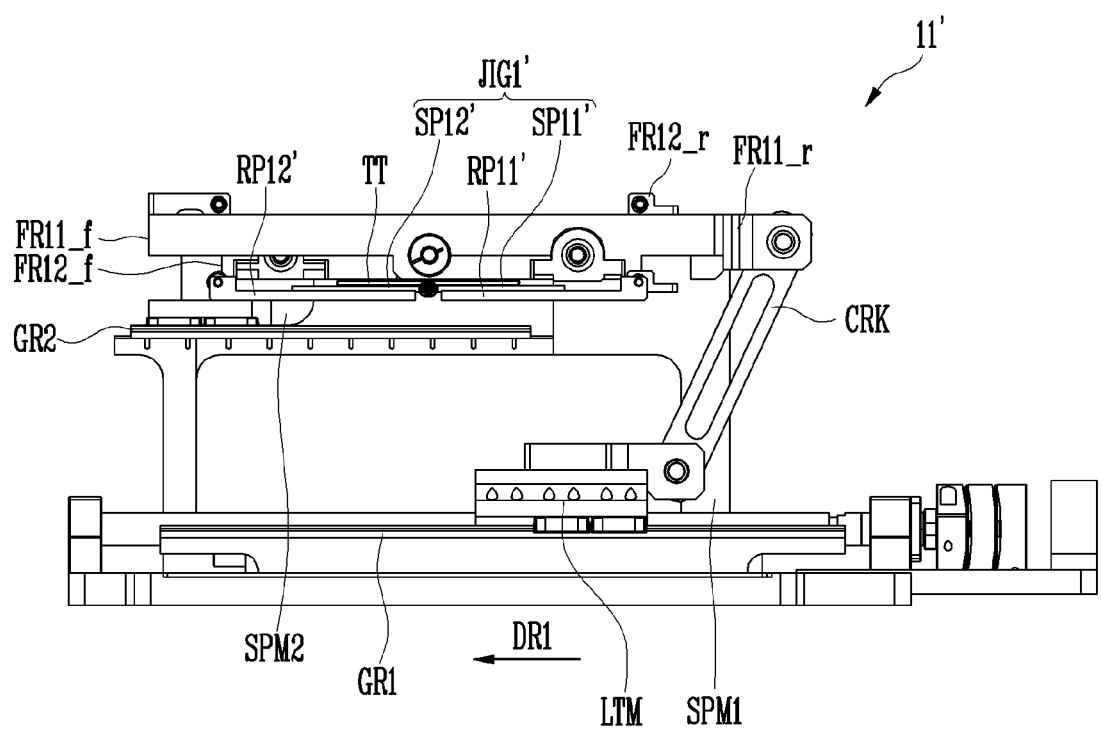
FIGS. 6 to 8 are views illustrating an exemplary embodiment of a process of performing an out-folding test using the folding test device.
Figure 7:
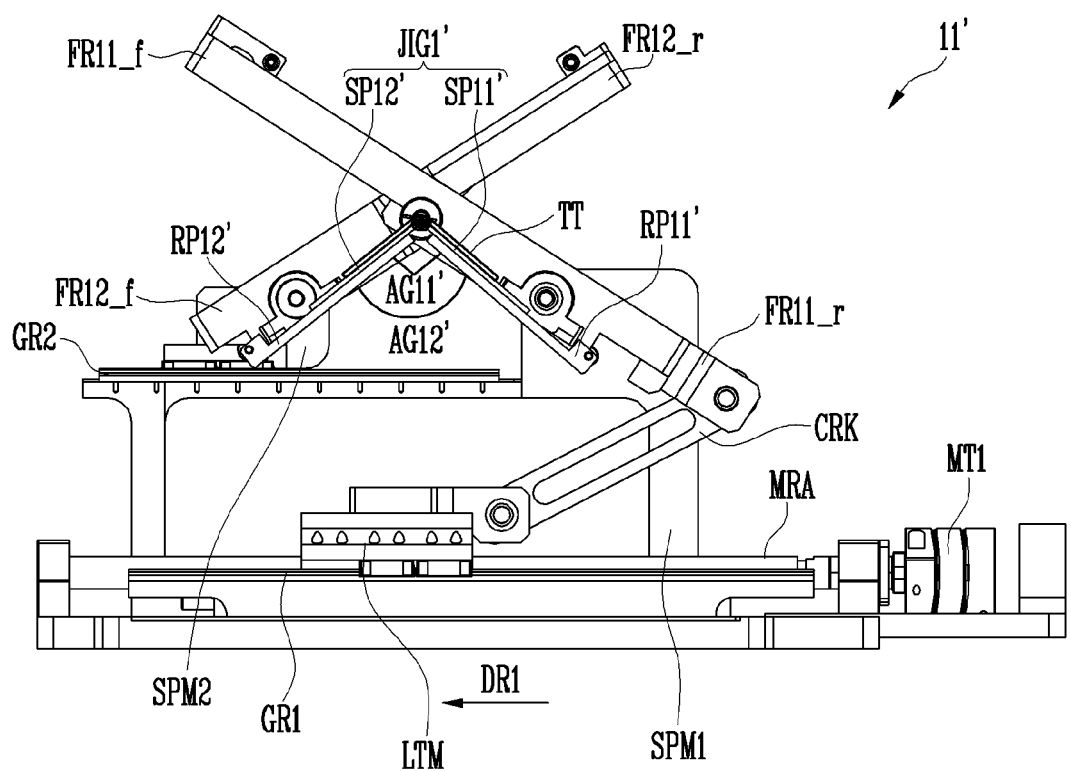
Figure 8:
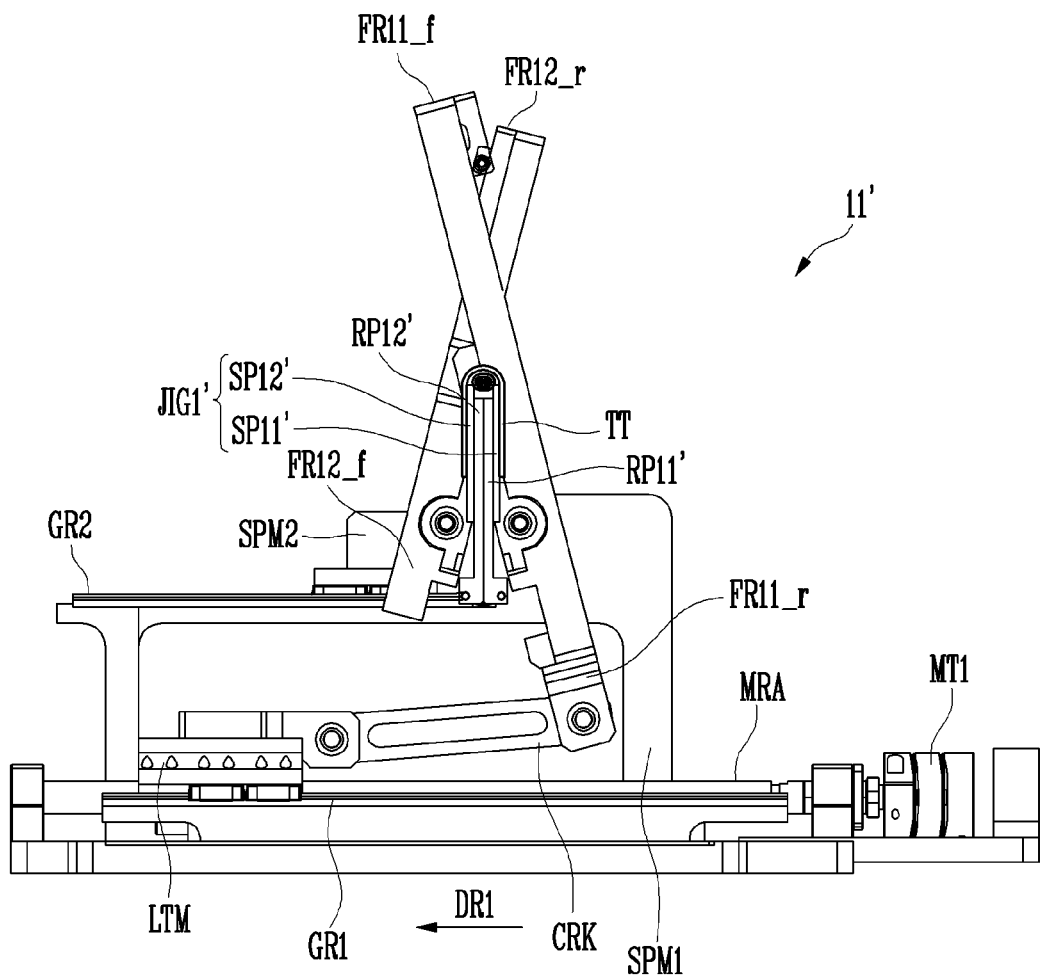

FIGS. 6 to 8 are views illustrating a process of performing an out-folding test using the folding test device according to the exemplary embodiment.

FIG. 6 shows a case where the test object TT is in the un-folding state (substantially 180 degrees). FIG. 7 shows a case where the test object TT is in the out-folding state (substantially 90 degrees). FIG. 8 shows a case where the test object TT is in the completely out-folding state. When the test object TT is a display device, the upper surface may be a display surface and the lower surface may be a non-display surface. Therefore, when a camera is positioned on the upper side of the folding test device 11', a display defect of the test object TT may be checked in the out-folding test procedure.

Referring to FIG. 6, when the test object TT is in the un-folding state, one end of the first frame FR11 and one end of the second frame FR12 may be adjacent to each other, and the other end of the first frame FR11 and the other end of the second frame FR12 may be adjacent to each other. The definition of one end and the other end is as described above with reference to FIG. 3.

When the out-folding test of the test object TT is performed, a first rotary plate RP11' may be rotatably connected to the other end FR11_r of the first frame FR11, and a second rotary plate RP12' may be rotatably connected to one end FR12_f of the second frame FR12. That is, according to the exemplary embodiment, there is an advantage that a folding test device 11' for the out-folding test may be easily configured by replacing only the rotary plates RP11' and RP12', while maintaining the first frame FR11, the second frame FR12, and other parts of the folding test device 11.

Referring to FIG. 7, when the test object TT is out-folded, the rotary driver MT1 may rotate the rotary shaft MRA in the first rotation direction. Accordingly, the linear motion member LTM may move in the first direction DR1 (e.g., leftward direction in FIG. 6) as compared with FIG. 6. As the linear motion member LTM moves, the first frame FR11 is drawn by the crank CRK. Therefore, the first frame FR11 may pivot on the point connected with the first support member SPM1. Accordingly, the rotary shaft FRA positioned at the intersection point of the first frame FR11 and the second frame FR12 moves (refer to FIG. 1), and the second frame FR12 moves along the guide rail GR2. Therefore, the second frame FR12 rotates in the direction opposite to that of the first frame FR11.

Referring to FIG. 7, in the case of out-folding the test object TT at substantially 90 degrees, in comparison with FIG. 6, one end FR11_f of the first frame FR11 may gradually move farther from one end FR12_f of the second frame FR12 and closer to the other end FR12_r of the second frame FR12. Also, one end FR12_f of the second frame FR12 may move gradually closer to the other end FR11_r of the first frame FR11.

When the test object TT is in the out-folding state, a first angle AG11' between the first rotary plate RP11' and the second rotary plate RP12' may be smaller than a second angle AG12' between the first frame FR11 and the second frame FR12. The first angle AG11' and the second angle AG12' may gradually decrease as the test object TT is further folded.

Referring to FIG. 8, as the rotary driver MT1 continuously rotates the rotary shaft MRA in the first rotation direction, the test object TT may be completely out-folded. The term "completely out-folded" may refer to a case when the first angle AG11' (refer to FIG. 7) is substantially zero degree.

When the test object TT is completely out-folded, a distance between the first rotary plate RP11' and the second rotary plate RP12' may be smaller than a distance between a first support plate SP11' and a second support plate SP12'.

In order to un-fold the test object TT again, the rotary driver MT1 may rotate the rotary shaft MRA in the second rotation direction. Accordingly, the linear motion member LTM linearly moves in a direction (e.g., rightward direction in FIG. 8) opposite to the first direction DR1, and the test object TT is un-folded.

Figure 9:
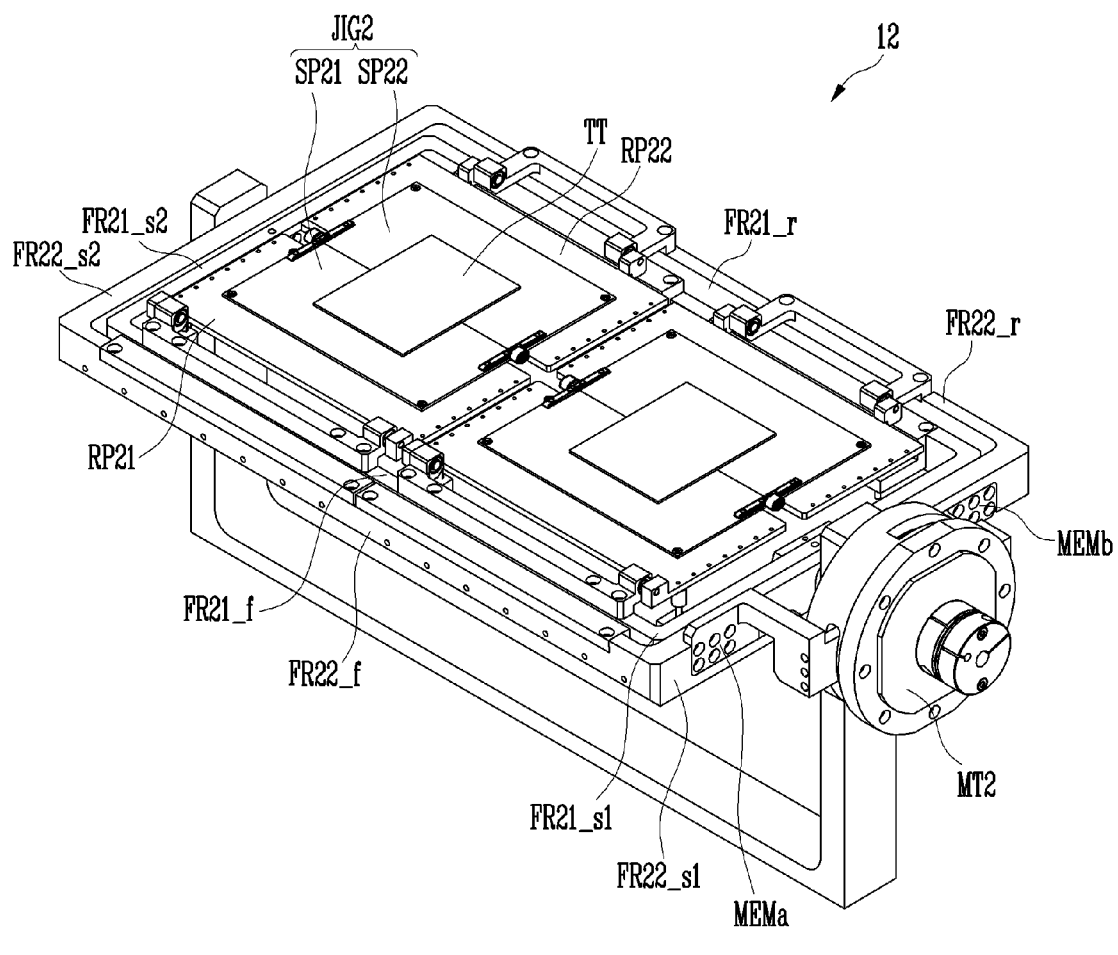
FIG. 9 is a view illustrating an exemplary embodiment of a folding test device according to the invention.

FIG. 9 is a view illustrating a folding test device according to an exemplary embodiment of the invention.

Referring to FIG. 9, a folding test device 12 according to the exemplary embodiment of the invention includes a jig JIG2, a first rotary plate RP21, a second rotary plate RP22, a first frame FR21, and a second frame FR22.

The jig JIG2 includes a first support plate SP21 and a second support plate SP22. The second support plate SP22 is rotatably connected to the first support plate SP21. The test object TT may be disposed on the jig JIG2. An exemplary configuration of the jig JIG2 may be the same or similar with the jig JIG1 of FIG. 2.

The jig JIG2 may be supported by the first rotary plate RP21 and the second rotary plate RP22. Specifically, the first rotary plate RP21 supports the first support plate SP21 of the jig JIG2, and the second rotary plate RP22 supports the second support plate SP22 of the jig JIG2. The second rotary plate RP22 according to the exemplary embodiment is separated from the first rotary plate RP21.

In a conventional folding test device, rotary plates were connected to each other. In order to test test objects having different radii of curvature, the rotary plates and a jig had to be replaced depending on the radius of curvature of each test object. However, according to the embodiment, the first rotary plate RP21 and the second rotary plate RP22 are separated from each other so that the first rotary plate RP21 and the second rotary plate RP22 may independently rotate regardless of the radius of curvature of the test object TT. According to the embodiment, the folding test may be performed by only replacing the jig JIG2 depending on the radius of curvature of each test object, thereby improving time and cost effectiveness of the folding test.

The first frame FR21 may include a front frame FR21_f, a side frame FR21_s1 substantially perpendicularly connected to the front frame FR21_f, a rear frame FR21_r substantially perpendicularly connected to the side frame FR21_s1, and a side frame FR21_s2 connecting the front frame FR21_f and the rear frame FR21_r. In an exemplary embodiment, the first frame FR21 may have a rectangular ring form, for example.

The first frame FR21 is separated from the second rotary plate RP22 and rotatably connected to the first rotary plate RP21. In FIG. 9, the front frame FR21_f of the first frame FR21 and the first rotary plate RP21 are rotatably connected to each other for the in-folding test.

The second frame FR22 may include a front frame FR22_f, a side frame FR22_s1 substantially perpendicularly connected to the front frame FR22_f, a rear frame FR22_r substantially perpendicularly connected to the side frame FR22_s1, and a side frame FR22_s2 connecting the front frame FR22_f and the rear frame FR22_r. In an exemplary embodiment, the second frame FR22 may have a rectangular ring form. The size of the second frame FR22 may be greater than the size of the first frame FR11 and an outer circumferential surface of the first frame FR21 may face an inner circumferential surface of the second frame FR22, for example.

The second frame FR22 is separated from the first rotary plate RP21 and rotatably connected to the second rotary plate RP22. In FIG. 9, the rear frame FR22_r of the second frame FR22 and the second rotary plate RP22 are rotatably connected to each other for the in-folding test.

The first frame FR21 and the second frame FR22 are rotatably connected to each other at an intersection point. The intersection point may refer to a point at which the first frame FR21 and the second frame FR22 always intersect with each other regardless of relative rotational positions of the first frame FR21 and the second frame FR22.

The folding test device 12 of the exemplary embodiment, unlike the exemplary embodiment of FIGS. 1 to 8, includes a rotary driver MT2 including a rotary shaft and extension members MEMa and MEMb extending in a radial direction from the rotary shaft. The second frame FR22 is coupled to the extension members MEMa and MEMb, and the first frame FR21 is gear-engaged to rotate in a direction opposite to a rotation direction of the rotary shaft of the rotary driver MT2. Therefore, the first frame FR21 and the second frame FR22 may rotate in opposite directions with reference to the intersecting point.

Referring to FIG. 9, the plurality of test objects TT may be simultaneously tested according to the sizes of the first frame FR21 and the second frame FR22. In the following description, however, one test object TT will be tested for convenience of explanation.

Figure 10:
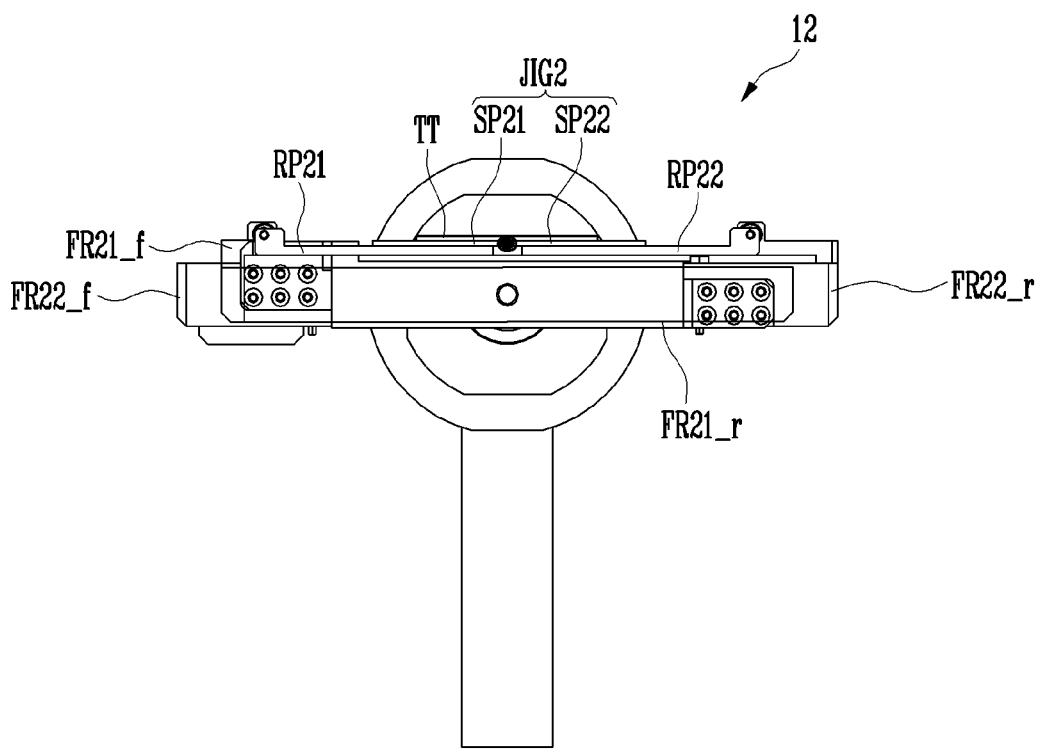
FIGS. 10 to 12 are views illustrating an exemplary embodiment of a process of performing an in-folding test using the folding test device.
Figure 11:
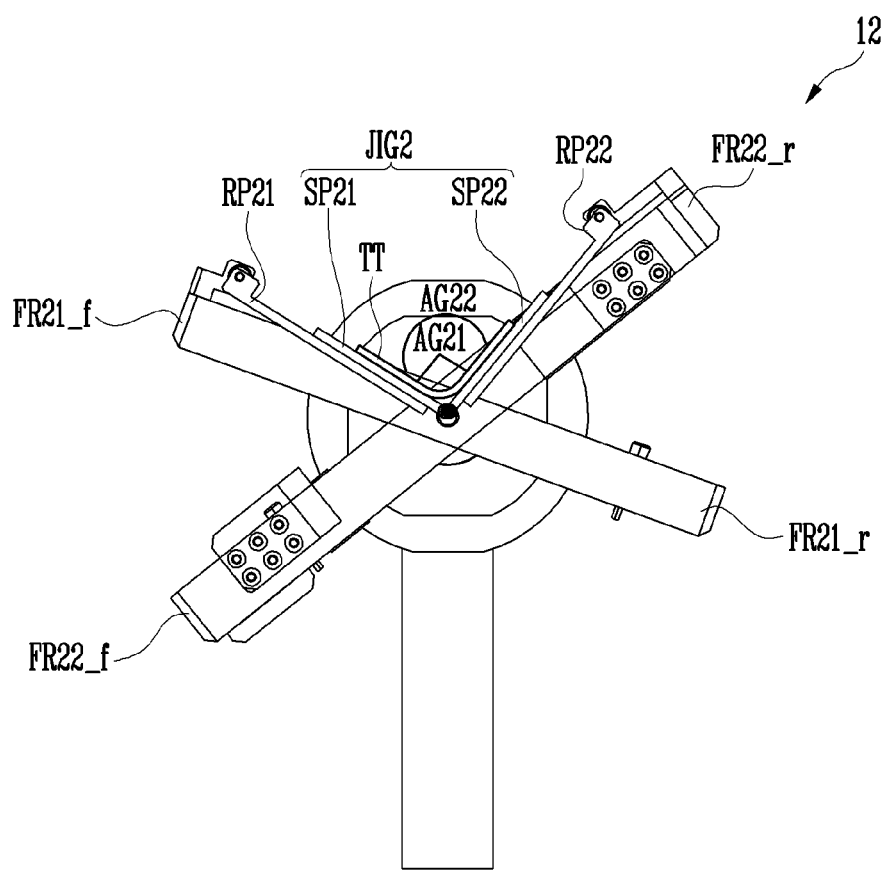
Figure 12:
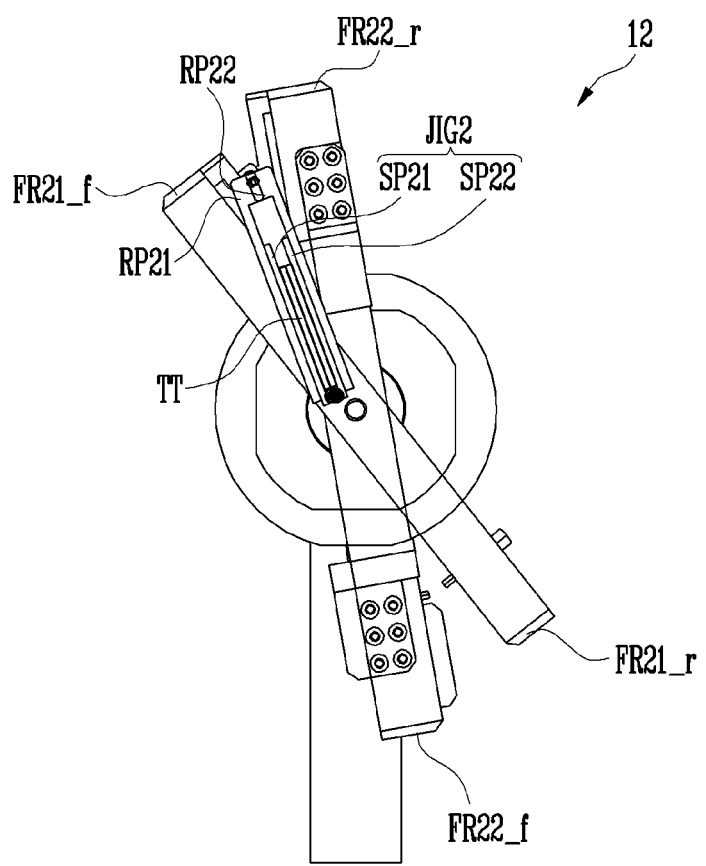

FIGS. 10 to 12 are views illustrating a process of performing an in-folding test using the folding test device according to the exemplary embodiment.

FIG. 10 shows a case where the test object TT is in the un-folding state (substantially 180 degrees). FIG. 11 shows a case where the test object TT is in the in-folding state (substantially 90 degrees). FIG. 12 shows a case where the test object TT is in the completely in-folding state. When the test object TT is a display device, the upper surface may be a display surface and the lower surface may be a non-display surface. Therefore, when a camera is positioned on the upper side of the folding test device 12, a display defect of the test object TT may be checked in the in-folding test procedure.

Referring to FIG. 10, when the test object TT is in the un-folding state, one end of the first frame FR21 and one end of the second frame FR22 may be adjacent to each other, and the other end of the first frame FR21 and the other end of the second frame FR22 may be adjacent to each other. The definition of one end and the other end is as described above with reference to FIG. 3.

When the in-folding test of the test object TT is performed, the first rotary plate RP21 may be rotatably connected to one end FR21_f of the first frame FR21, and the second rotary plate RP22 may be rotatably connected to the other end FR22_r of the second frame FR22.

Referring to FIG. 11, in the case of in-folding the test object TT at substantially 90 degrees, in comparison with FIG. 10, one end FR21_f of the first frame FR21 may gradually move farther from one end FR22_f of the second frame FR22 and closer to the other end FR22_r of the second frame FR22. Also, one end FR22_f of the second frame FR22 may gradually move closer to the other end FR21_r of the first frame FR21.

When the test object TT is in the in-folding state, a first angle AG21 between the first rotary plate RP21 and the second rotary plate RP22 may be smaller than a second angle AG22 between the first frame FR21 and the second frame FR22. The first angle AG21 and the second angle AG22 may gradually decrease as the test object TT is further folded.

Referring to FIG. 12, as the rotary driver MT2 continuously rotates the rotary shaft in the first rotation direction, the test object TT may be completely in-folded. The term "completely in-folded" may refer to a case when the first angle AG21 (refer to FIG. 11) is substantially zero degree.

When the test object TT is completely in-folded, a distance between the first rotary plate RP21 and the second rotary plate RP22 is greater than a distance between the first support plate SP21 and the second support plate SP22.

In order to un-fold the test object TT again, the rotary driver MT2 may rotate the rotary shaft in a second rotation direction. The second rotation direction may be opposite to the first rotation direction. Accordingly, the test object TT is un-folded.

Figure 13:
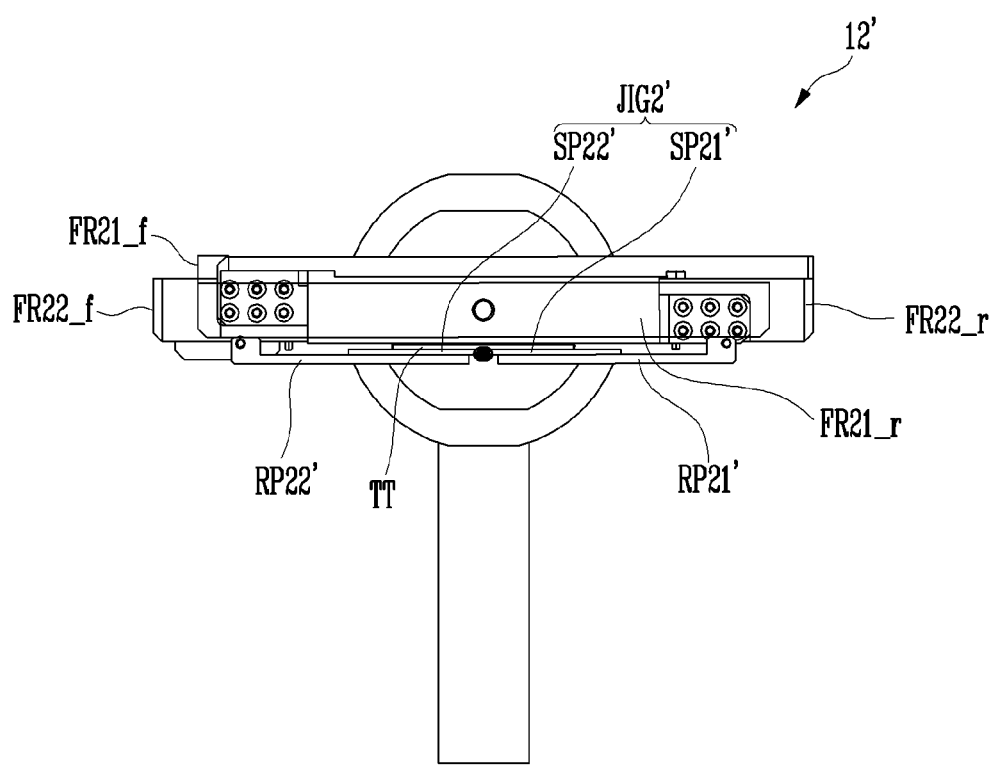
FIGS. 13 to 15 are views illustrating an exemplary embodiment of a process of performing an out-folding test using the folding test device.
Figure 14:
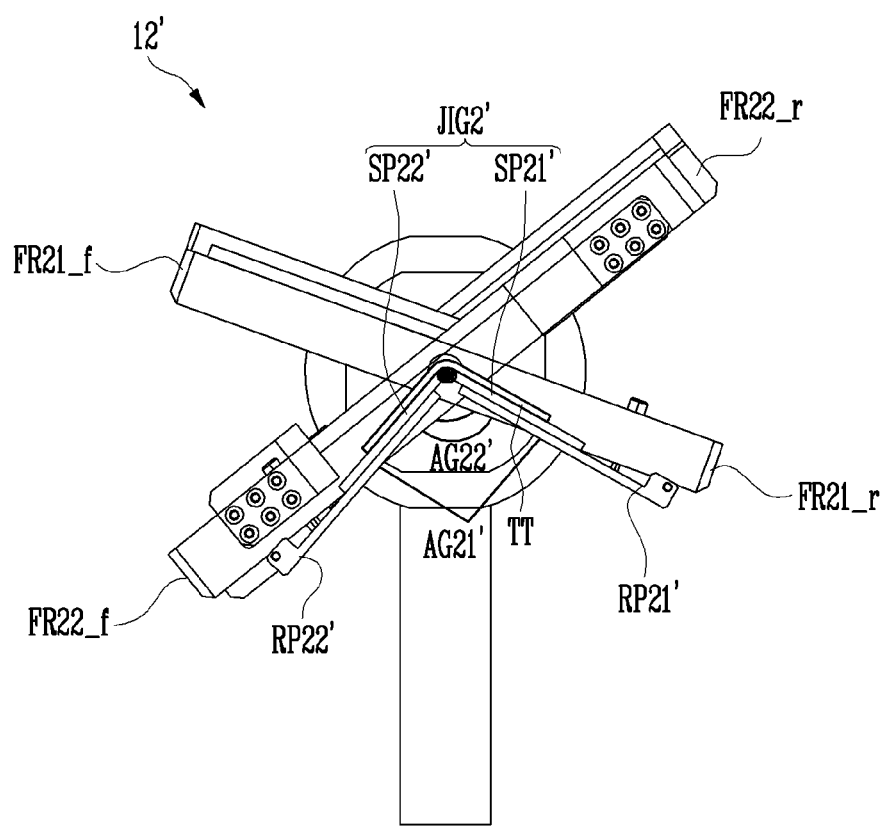
Figure 15:
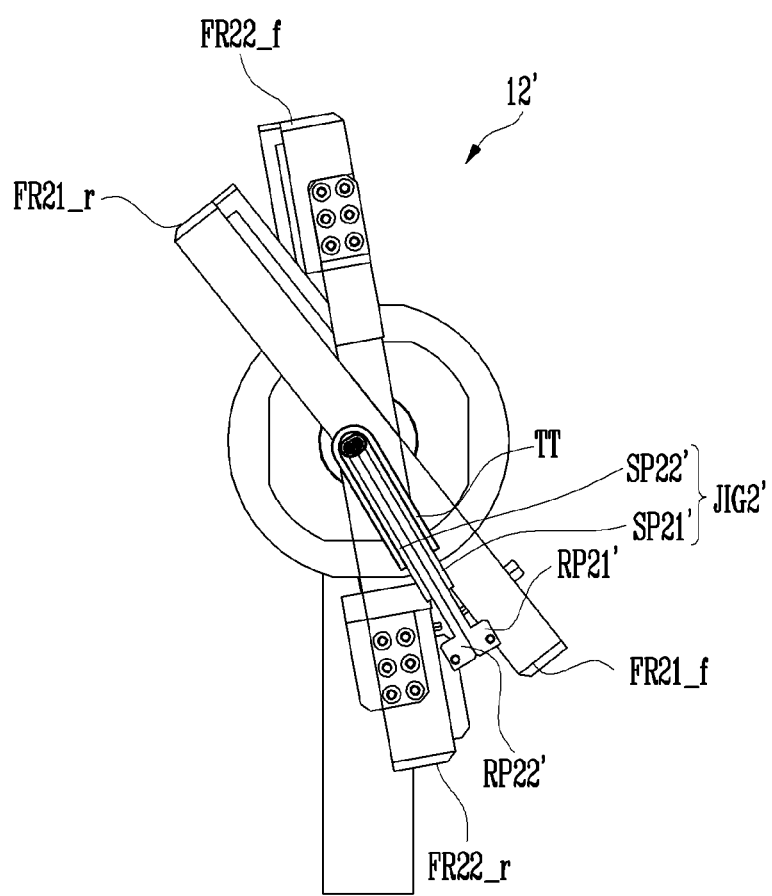

FIGS. 13 to 15 are views illustrating a process of performing an out-folding test using the folding test device according to the exemplary embodiment.

FIG. 13 shows a case where the test object TT is in the un-folding state (substantially 180 degrees). FIG. 14 shows a case where the test object TT is in the out-folding state (substantially 90 degrees). FIG. 15 shows a case where the test object TT is in the completely out-folding state. When the test object TT is a display device, the upper surface may be a display surface and the lower surface may be a non-display surface. Therefore, when a camera is positioned on the upper side of a folding test device 12', a display defect of the test object TT may be checked in the out-folding test procedure.

Referring to FIG. 13, when the test object TT is in the un-folding state, one end of the first frame FR21 and one end of the second frame FR22 may be adjacent to each other, and the other end of the first frame FR21 and the other end of the second frame FR22 may be adjacent to each other. The definition of one end and the other end is as described above with reference to FIG. 3.

When the out-folding test of the test object TT is performed, a first rotary plate RP21' may be rotatably connected to the other end FR21_r of the first frame FR21, and a second rotary plate RP22' may be rotatably connected to one end FR22_f of the second frame FR22. That is, according to the exemplary embodiment, the folding test device 12' for the out-folding test may be easily configured by replacing only the rotary plates RP21' and RP22' while maintaining the first frame FR21, the second frame FR22, and other parts of the folding test device 12.

Referring to FIG. 14, in the case of out-folding the test object TT at substantially 90 degrees, in comparison with FIG. 13, one end FR21_f of the first frame FR21 may gradually move farther from one end FR22_f of the second frame FR22 and closer to the other end FR22_r of the second frame FR22. Also, one end FR22_f of the second frame FR22 may gradually move closer to the other end FR21_r of the first frame FR21.

When the test object TT is in the out-folding state, a first angle AG21' between the first rotary plate RP21' and the second rotary plate RP22' may be smaller than a second angle AG22' between the first frame FR21 and the second frame FR22. The first angle AG21' and the second angle AG22' may gradually decrease as the test object TT is further folded.

Referring to FIG. 15, as the rotary driver MT2 continuously rotates the rotary shaft in the first rotation direction, the test object TT may be completely out-folded. The term "completely out-folded" may refer to a case when the first angle AG21' (refer to FIG. 14) is substantially zero degree.

When the test object TT is completely out-folded, a distance between the first rotary plate RP21' and the second rotary plate RP22' is smaller than a distance between the first support plate SP21' and the second support plate SP22'.

In order to un-fold the test object TT again, the rotary driver MT2 may rotate the rotary shaft in the second rotation direction. Accordingly, the test object TT is un-folded.

In the folding test device according to the invention, it is possible to perform both the in-folding test and the out-folding test.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other exemplary embodiments unless otherwise specifically indicated. Accordingly, it will be understood by those of skill in the art that various changes in form and details may be made without departing from the spirit and scope of the invention as set forth in the following claims.

What is claimed is:

1. A folding test device comprising:
   a jig comprising a first support plate and a second support plate rotatably connected to the first support plate;
   a first rotary plate supporting the first support plate;
   a second rotary plate supporting the second support plate and separated from the first rotary plate;
   a first frame separated from the second rotary plate and rotatably connected to the first rotary plate; and
   a second frame separated from the first rotary plate and rotatably connected to the second rotary plate,
   wherein the first frame and the second frame are rotatably connected to each other at an intersection point.

2. The folding test device of claim 1,
wherein, when a test object is in an un-folding state, a first end of the first frame and a first end of the second frame are adjacent to each other, and a second end of the first frame and a second end of the second frame are adjacent to each other.

3. The folding test device of claim 2,
wherein the first end of the first frame gradually moves farther from the first end of the second frame and closer to the second end of the second frame, and the first end of the second frame gradually moves closer to the second end of the first frame when the test object is folded.

4. The folding test device of claim 3,
wherein, when an in-folding test of the test object is performed, the first rotary plate is rotatably connected to the first end of the first frame, and the second rotary plate is rotatably connected to the second end of the second frame.

5. The folding test device of claim 4,
wherein, when an out-folding test of the test object is performed, the first rotary plate is rotatably connected to the second end of the first frame, and the second rotary plate is rotatably connected to the first end of the second frame.

6. The folding test device of claim 5,
wherein, when the test object is in a folding state, a first angle between the first rotary plate and the second rotary plate is smaller than a second angle between the first frame and the second frame, and the first angle and the second angle gradually decrease as the test object is further folded.

7. The folding test device of claim 4,
wherein, when the test object is in an in-folding state, a distance between the first rotary plate and the second rotary plate is greater than a distance between the first support plate and the second support plate.

8. The folding test device of claim 5,
wherein, when the test object is in an out-folding state, a distance between the first rotary plate and the second rotary plate is smaller than a distance between the first support plate and the second support plate.

9. The folding test device of claim 1, further comprising:
a rotary driver comprising a rotary shaft;
a linear motion member connected to the rotary shaft so as to be linearly movable in an extending direction of the rotary shaft; and
a crank connecting the linear motion member and an end of the first frame.

10. The folding test device of claim 9, further comprising:
a first support member rotatably connected to the first frame and fixed in a position in the folding test device;
a second support member rotatably connected to the second frame; and
a guide rail allowing the second support member to linearly move in the extending direction of the rotary shaft.

11. The folding test device of claim 10,
wherein the rotary driver rotates the rotary shaft in a first rotation direction so as to fold the test object.

12. The folding test device of claim 11,
wherein the rotary driver rotates the rotary shaft in a second rotation direction so as to un-fold the test object, and
wherein the second rotation direction is opposite to the first rotation direction.

13. The folding test device of claim 1,
further comprising a rotary driver comprising a rotary shaft and an extension member extending in a radial direction from the rotary shaft,
wherein the second frame is coupled to the extension member, and
wherein the first frame is gear-engaged to rotate in a direction opposite to a rotation direction of the rotary shaft.

14. The folding test device of claim 1,
wherein the first support plate and the second support plate are rotatably connected to each other through a gear, and
wherein a size of the gear is determined depending on a radius of curvature of the test object.

* * * * *